(12) United States Patent
Freedman et al.

(10) Patent No.: US 8,818,963 B2
(45) Date of Patent: Aug. 26, 2014

(54) HALLOWEEN PROTECTION IN A MULTI-VERSION DATABASE SYSTEM

(75) Inventors: Craig Steven Freedman, Sammamish, WA (US); Conor John Cunningham, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 12/915,994

(22) Filed: Oct. 29, 2010

(65) Prior Publication Data

US 2012/0109903 A1 May 3, 2012

(51) Int. Cl.
*G06F 7/00* (2006.01)
*G06F 17/00* (2006.01)

(52) U.S. Cl.
USPC ............................ 707/690; 707/704; 707/803

(58) Field of Classification Search
USPC ................. 707/690, 803, 999.202, 999.203, 707/999.001, 999.002, 704; 717/114, 122, 717/805
See application file for complete search history.

(56) References Cited

U.S. PATENT DOCUMENTS

| | | | |
|---|---|---|---|
| 5,317,731 A | 5/1994 | Dias et al. | |
| 6,009,425 A * | 12/1999 | Mohan ................................. | 1/1 |
| 6,122,644 A * | 9/2000 | Graefe et al. ........................ | 1/1 |
| 7,305,386 B2 | 12/2007 | Hinshaw et al. | |
| 7,707,195 B2 | 4/2010 | Nettleton et al. | |
| 2004/0249838 A1 * | 12/2004 | Hinshaw et al. .............. | 707/100 |
| 2009/0172641 A1 * | 7/2009 | Wong ............................ | 717/122 |
| 2009/0271763 A1 * | 10/2009 | Varma et al. .................. | 717/114 |
| 2010/0235860 A1 * | 9/2010 | White et al. ..................... | 725/39 |

OTHER PUBLICATIONS

Hellerstein, "Architecture of a Database System," Foundations and Trends in Databases, vol. 1, No. 2, 2007, pp. 141-259, http://db.cs.berkeley.edu/papers/fntdb07-architecture.pdf.
Oracle, Oracle Database Concepts, 13 Data Concurrency and Consistency, http://download.oracle.com/docs/cd/B19306_01/server.102/b14220/consist.htm.
Todd, "IBPhoenix Development: InterBase: What Sets It Apart," http://web.archive.org/web/20030408062029/http:/www.ibphoenix.com/main.nfs?a=ibphoenix&page=ibp_bill_todd_mga.
Author Unknown, PostgreSQL 9.0.1 Documentation Chapter 13. Concurrency Control Transaction Isolation, http://www.postgresql.org/docs/9.0/static/transaction-iso.html.
Blakeley et al., "Distributed/Heterogeneous Query Processing in Microsoft SQL Server," http://ieeexplore.ieee.org/Xplore/login.jsp?url=http%3A%2F%2Fieeexplore.ieee.org%2Fstamp%2Fstamp.jsp%3Farnumber%3D01410211&authDecision=-201.
Author Unknown, Oracle® Rdb7 forOpenVMS, http://download.oracle.com/otn_hosted_doc/rdb/pdf/rdbrn_7062.pdf.

* cited by examiner

*Primary Examiner* — Dung K Chau
(74) *Attorney, Agent, or Firm* — Nicholas Chen; David Andrews; Micky Minhas

(57) ABSTRACT

Mitigating problems related to the Halloween problem including where update operations potentially allow the record to be visited more than once during the operation. A method includes accessing an instance of a data store operation statement. The instance of the data store operation statement is executed causing an update or delete to an old version of data store record or creation of a data store record resulting in a new version of the data store record in the case of an update or creation of a data store record and a deleted version of the data store record in the case of a delete in the data store. The instance of the data store operation statement is correlated with the new version of the data store record or the deleted version of the data store record.

20 Claims, 2 Drawing Sheets

HALLOWEEN PROTECTION IN A MULTI-VERSION DATABASE SYSTEM

BACKGROUND

Background and Relevant Art

Computers and computing systems have affected nearly every aspect of modern living. Computers are generally involved in work, recreation, healthcare, transportation, entertainment, household management, etc.

Data in computing systems is often stored in one or more databases. A database is a collection of related data. Data in the database are commonly organized in a two-dimensional row and column form called a table. A database typically includes multiple tables and multiple associative structures. A table is an object in the database containing zero or more records and at least one field within each record. A record may be embodied as a row in the table that is identified by a unique numeric called a record identifier. A field is a subdivision of a record to the extent that a column of data in the table represents the same field for each record in the table. An example of an associative structure in a database is an index, typically, but not necessarily, a form of B-tree or hash index. Associative structures are transparent to users of a database but are important to efficient operation and control of the database management system. A database management system is a control system that supports database features including, but not limited to, storing data on a memory medium, retrieving data from the memory medium and updating data on the memory medium.

A query is used to access or update data in a database. The query is typically constructed in a variant of Structured Query Language (SQL) that may or may not be compliant with the American National Standards Institute (ANSI) standard SQL definition. A SQL query is non-procedural in that it specifies the objective or desired result of the query in a language meaningful to a user but does not define the steps or procedure by which the query should be accomplished. When a SQL query is applied to a database, the query optimizer of the database management system processes the non-procedural query to create an execution plan. An execution plan is procedural in that it determines the order and type of operations or operators to be performed to carry out the objectives of the SQL query. The combination of non-procedural update requests (SQL queries) and procedural execution plans creates both the opportunity and the need for automatic planning of execution plans by the query optimizer. A query optimizer can generate a plurality of different query plans for any given SQL query and is typically configured to generate a query plan according to efficiency objectives.

An update is a common type of query executed on data in a database. An update is any operation that modifies existing records in a database as well as insertions and deletions of records in a database. As used herein, an update includes any database modification, including value changes (updates in the narrow sense), insertions, deletions, upserts (combination of update and insert which updates if exists in the database or inserts if does not exit), merges, etc. The semantics of execution plans may be prescribed by the ANSI/ISO standard for SQL languages. According to this standard, the semantics of any update statement is the same as three separate phases of execution, with no overlap between phases. First, a read-only search of the database determines the records to be updated, inserted or deleted as well as the new column values. Second, records and columns are updated. Third, consistency constraints defined for the database are verified.

An update to a record in a table also includes updates to index entries in indexes and other associative structures associated with the updated table. Changes to associative structures, in fact the associative structures themselves, are typically not visible to a user as they result from the procedural execution of the execution plan.

An operator using record-at-a-time pipelining fully processes, i.e., produces output, each time a record satisfying the predicate of the query is located. An operator using set-at-a-time pipelining consumes all of its input and only then is output produced from the operator. Record-at-a-time processing may be more efficient in traditional systems for small cardinality changes. Large cardinality changes may be more efficient in the set-at-a-time approach because it can sort records and perform changes using sequential IO instead of random IO against traditional disk drives.

There is a particular problem in the field of database updating known as the Halloween problem. The Halloween problem has been well known since it was first noticed on Halloween day, 1975 by researchers at IBM's San Jose research laboratories. The Halloween problem in database systems may be evident in data modification statements (inserts, updates, and deletes) generating incorrect results because the process of modifying the database state changes the behavior of the executing statement and induces it to modify the wrong set of records (either due to skipping records or due to modifying the same records multiple times).

A typical example for the Halloween problem is the request (a SQL query) to "give all employees with salaries greater than $30,000 a 5% raise". If (i) these employees are found using an index on salaries, and (ii) index entries are scanned in increasing salary order, and (iii) the scan cannot distinguish index entries that have already been updated by this request from those that have not, and (iv) the index is updated immediately as index entries are found (record-at-a-time pipelining), then each qualifying employee will get an infinite number of raises. Thus, processing this request will not terminate.

One simple solution to the Halloween problem is physical phase separation in which the identification of the set of records to modify and the actual modification of these records are run serially (one after the other) rather than concurrently. In one simple example, a blocking operator such as a spool is used to achieve physical phase separation. More complex solutions involve exploiting detailed knowledge of the behavior of the underlying query processor and storage engine to generate plans and/or to analyze and prove that selected plans will behave correctly without physical phase separation, without the use of a spool or other blocking operator, and in spite of running both phases concurrently.

While there are several known approaches to avoiding the Halloween problem, such approaches often result in significant increases in overhead resources such as storage space resources or processing resources.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One example illustrated herein is directed to a method practiced in a computing environment. The method includes acts for mitigating problems related to the Halloween problem including where update operations potentially allow the record to be visited more than once during the operation. The method includes accessing an instance of a data store operation statement. The instance of the data store operation statement is executed. Executing the statement causes an update or delete to an old version of a data store record or creation of a data store record. Updating a data store record or creating a data store record results in a new version of the data store record. Deleting a data store record results in a deleted version of the data store record. The instance of the data store operation statement is correlated with the new version of the data store record or the deleted version of the data store record.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In computing applications, statements are used to operate on records in databases. For example, statements can be used to create, read, update, or delete database records. Embodiments may implement functionality whereby statements used to create, update or delete records are associated with the records created updated, or deleted by the statements.

For example, some embodiments may use per-statement version information (e.g. in the data record format or in a header of a record) to distinguish records created (or inserted) or deleted by the current statement from records created or deleted by previous statements in the same or different transactions. This version information can be used to hide records created or show records deleted by the current statement. Additionally, this may be used to allow embodiments to show the current statement a view of the database as it existed when the statement (or in some embodiments a transaction) began execution. In some embodiments, this creates the logical effect of phase separation while enabling greater operator concurrency and without necessarily needing physical phase separation or a spool operator.

Figure 1:
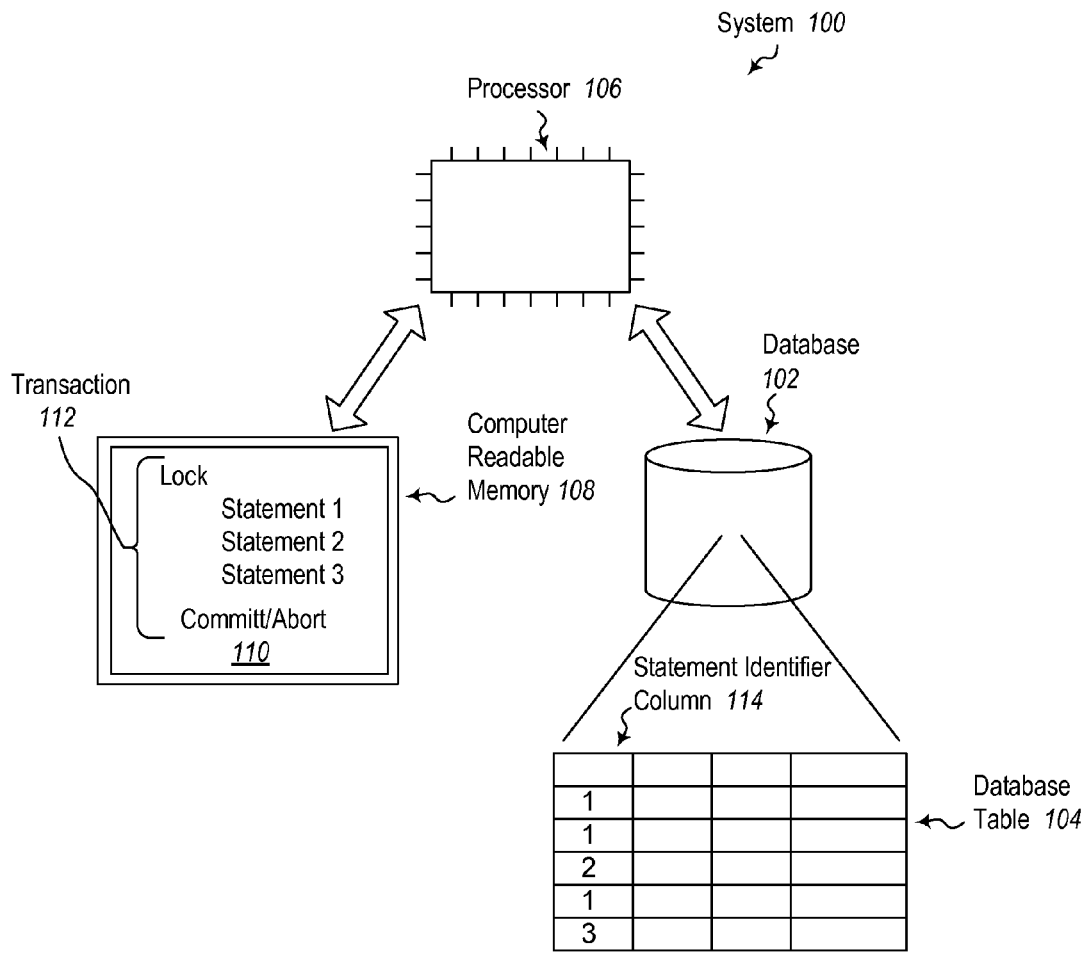
FIG. 1 illustrates an example database system.

Referring now to FIG. 1, an example is illustrated. FIG. 1 illustrates a system 100. Within the system 100 is a database 102. The database 102 includes a database table 104. The database table 104 includes various rows and columns for storing data records. In the example illustrated, records are implemented as rows in the database table 104. FIG. 1 also illustrates a processor 106. The processor 106 is connected to a computer readable memory 108. The computer readable memory 108 stores various modules including computer executable instructions that when executed by the processor 106, or one or more other processors, perform various actions. In the example illustrated in FIG. 1, a module 110 is illustrated. The module 110 includes a transaction 112. The transaction is a set of statements defining functions that must all succeed or all fail atomically. For example, consider a simple financial transaction. In the simple example illustrated, a debit is made to one account while a credit is made to another account. Transactionally, neither the debit or credit can occur without the other without causing data inconsistencies. Thus, the transaction may include statements causing the debit to be performed and statements causing a credit to be performed. If both the credit and debit are performed, then the effect of the debit and the credit are made durable, sometimes referred to as committing the transaction. If either the debit or credit fail, the transaction is aborted and all intermediate functions are rolled back to a state that existed before the transaction was begun.

In the example illustrated in FIG. 1, the transaction 112 includes three statements within a lock. The lock illustrated is not required, but may be used for some embodiments. The statements in the transaction 112 may be used to operate on records in the database table 104. Some embodiments described herein may implement functionality for addressing the Halloween problem by augmenting version stores with per-statement version numbers to differentiate records created by the current statement from records created by earlier statements. In particular, some embodiments may assign an identifier to each statement in the transaction 112. When a statement performs certain functions on records in the database table 104, the identifier assigned to the statement performing the functions may be associated with the record on which the function was performed.

For example, in some embodiments, extra information is stored with each new record created in a database table 104 and each existing record in a database table deleted by a statement within a transaction 112. In the example illustrated in FIG. 1, a statement identifier column 114 is included in the database table 104. The statement identifier column 114 includes an identifier identifying a statement from the transaction 112 that created a corresponding row. In the example illustrated, the identifier 1 corresponds to Statement 1, the identifier 2 corresponds to Statement 2, and the identifier 3 corresponds to Statement 3. While in the illustrated example, the identifier is shown as being include in a column element of a record, it should be appreciated that other methods of storing and correlating the identifier may be used alternatively or additionally. For example, in some embodiments, the identifier may be stored in a record header. Alternatively or additionally, embodiments may be implemented where records are correlated to statements by creating a statement table for a statement in which records created by the statement are stored in the statement table. Various examples will be illustrated further herein.

Storing extra information allows a determination to be made when reading a set of records as to which records were created by the current statement and which ones already existed prior to the start of the statement execution. Embodiments may utilize multi-versioning by relying on deletes and updates not immediately deleting or destroying old versions of records, but rather creating and inserting a new version to supersede the old version. Thus, after an update both the old and new versions of the updated record exist in the database table 104 at the same time and a statement that creates the new version can still read the old version, but may be prevented from reading the new version that the statement itself created.

In particular, this extra information can be used to ensure that a data modification statement sees only the state of the database as it existed before the statement started execution and to prevent a statement from seeing its own changes. Some embodiments may cause these conditions to be true for all data modification statements including insert, update (modify), and delete statements.

Embodiments may be implemented where because data modification statements never see their own changes, there is no need to employ other existing Halloween protection mechanisms such as explicit phase separation via the insertion of a blocking operator (such as a spool or sort) which may copy all input records before producing any output records. The elimination of other Halloween protection mechanisms can reduce compilation time and complexity, reduce the risks of bugs where the Halloween protection analysis is incorrect or where Halloween protection is applied incorrectly, and can improve execution time by eliminating unnecessary and costly Halloween protection spools.

Embodiments can be applied to multi-version database systems including SQL® Server's snapshot isolation. Embodiments can be applied to disk-based and/or main-memory systems and to systems that use either pessimistic (i.e., lock-based) or optimistic (i.e., validation-based) concurrency control schemes.

There are various implementation options for correlating data store operation statements with version of data store records. A number of these will be discussed below. For example one embodiment may assign each statement within a transaction 112 a unique version number. In some embodiments, these numbers can be generated as monotonically increasing integers. The example illustrated in FIG. 1 illustrates just such an example. Alternatively or additionally, a time stamp assigned to statement may be used, such as for example, a time stamp indication when the statement first performed some function on a record. While these example embodiments have been illustrated, it should be appreciated that any one of a number of different number schemes may be used. For example, in some embodiments, any scheme that generates unique numbers for statements, either globally or within a transaction, can be used.

As noted, embodiments, may be implemented where a version number for a statement is stored in each record created by that statement. Embodiments may be implemented where when reading, that statement is only allowed to see records that do NOT contain the current version number, i.e. the version number corresponding to the statement. For example, in FIG. 1, Statement 3 of the transaction 112 can read records with identifiers 1 and 2 in the statement identifier column 114, but cannot read records with the identifier 3 in the statement identifier column.

If each transaction also has its own transaction identifier (which is common in multi-version systems), and if the transaction identifier is stored with any record created by the transaction, statement version numbers can be reused by statements in different transactions. Thus, for example, a 4-byte version number would allow up to $2^{32}$ (about 4 billion) statements per transaction and should be sufficient to allow any reasonable transaction to complete. In alternative embodiments version numbers can nonetheless be transaction context specific even when transaction identifiers are not stored with any record created by the transaction. In these embodiments, part of the transaction committing process may include clearing version numbers from records.

Embodiments may be implemented to use fewer bytes to store the version number. However, if an implementation uses too few bytes, it could run out of statement identifiers before a transactions completes. If this happens, the various alternatives may be implemented. For example, embodiments, may abort the current transaction. In such embodiments, it may not be possible to complete all transactions using this implementation of the invention. Thus alternate data handling methods may need to be performed. In alternative embodiments, embodiments may begin reusing version numbers. Before version numbers can be reused, all records previously created by this transaction have their current version numbers reset to a "safe" version number. For example, an implementation could reset all version numbers to zero and then begin assigning new version numbers from 1. The list of records that need to be reset can be efficiently identified by keeping a list of records updated by the current transaction. This can be accomplished using existing database functionality. For example many database systems already keep a list of records updated by the current transaction for the transaction log. If the version number needs to be reset more than once, it suffices to recall where the last reset left off and visit (and reset the version number) for each record only once.

An extreme example of using small version numbers is embodied in an implementation that uses a single bit to indicate which records were created by the current statement. For example, a value of zero might mean that the record was created previously while a value of 1 might mean that the record was created by the current statement. This bit would be reset as described above after each statement or before starting to execute a new statement.

At the other end of the spectrum, an implementation could assign transaction and statement identifiers from a single unique identifier space. This scheme would potentially allow for the use of larger identifiers.

In the examples illustrated above, statement identifiers were stored with records. However, alternative embodiments may be implemented where a transaction stores a list of records created or deleted by the current statement. In some embodiments, this list may be stored in a data structure such as a hash table that makes searches efficient. A single list could be used for records that are created or deleted. However, both inserted and deleted records are added to the list. However, presence in the list has different effects depending on whether a record was inserted or deleted. For example, if the record is identified in the list as a result of being inserted, then the statement is prevented from reading the record. If the record is identified in the list as a result of being deleted, then the statement would still be allowed to see the record. An indicator can be included in the list to indicate if the record is in the list as a result of being inserted or deleted. Alternatively or additionally, the record itself may have some sort of indicator to indicate if the record is a deleted record. Alternatively or additionally, presence in the list simply reverses the default visibility of a record. This list can be discarded after each statement completes. When reading, if a statement encounters a record created by the current transaction, it checks the list of records associated with the current transaction to determine if the record was created by the current statement and should be skipped or whether it previously existed and should be visible or in the case of a deleted statement if the record was created by the current statement and should be visible or whether it previously was deleted and should be skipped.

Storing the statement version number with each record is particularly suitable to main memory systems where the cost of returning to a record to reset the version number is limited to a memory write. Disk based systems may need to perform an extra disk write or even an extra disk read if the page containing a record needing a version number reset has already been flushed to disk and/or evicted from memory. Thus, disk based systems might benefit from the embodiments described above that include storing a separate list of records.

Statement version numbers can be associated with both inserted records (so as to hide them from the current statement) and deleted records (so as to continue to show them to the current statement). In a system that does not permit a transaction to delete a record that was created by a different transaction that has not yet been committed, it is sufficient to use the same memory to store the version number of the statement that created the record and later the version number of the statement that deleted the record. Embodiments may be implemented where the transaction that created the record need not have committed, but it is finished with its active processing. For example, the transaction could be in a "precommit" or "validating" phase. The requirement is that both statements cannot be executing concurrently. Similarly, if a statement tries to delete a record that was created by an earlier statement in the same transaction, the second statement can overwrite the version number of the first statement as long as both statements cannot be executing concurrently.

One embodiment implementation may choose to conserve version numbers by only assigning version numbers to statements that have potential Halloween protection requirements. This may be done, for example, to reduce the number of bytes needed to store numbers. For example, in one simple embodiment, only statements that modify data need version numbers. A more sophisticated implementation might also assign version numbers only to statements that read and write from the same table or to statements where the reads and writes could potentially conflict. For example, if a statement already contains a blocking operator (e.g., a sort) between the read and the write, there is no need to assign a new version number to the statement because a statement will not be capable of reading records that it created anyway. This optimization is especially helpful if a single bit is used to track which records were created by the current statement or if the transaction stores a list of records created by the current statement.

Embodiments may be implemented where version numbers are compressed. For example, the number of bits or bytes allocated for version numbers may be based on transaction size. For example, transactions that execute fewer statements and generate relatively few version numbers could use less storage for these version numbers by tailoring the number of bits or bytes available for version numbers. For example, a transaction that executes 127 or fewer statements would need at most one byte of storage to store these version numbers.

Some embodiments may have various restrictions applied. For example, embodiments may be implemented where a statement cannot delete a record that it inserts. This can be accomplished by, as illustrated above, a design where a statement cannot read a record that it inserts and it cannot delete a record that it cannot read.

Embodiments may be implemented where a statement in one transaction cannot delete a record that was inserted by a concurrent statement in a second transaction until the concurrent statement completes and the second transaction commits. Notably, some embodiments may be implemented where the second transaction only has to begin the process of committing inasmuch as the concurrent statement must complete either way.

A single statement id per record is sufficient to track both inserted records and deleted records. If a statement is trying to read a record that was inserted by the statement, the statement will be prevented from reading the record because of the version identifier. If a statement is trying to read a record that was deleted by the statement, the statement will be allowed to read the record because of the version identifier. Thus a statement will be allowed to read inserted (and not yet deleted) records that it did not insert but will not be allowed to read inserted (and not yet deleted) records that it did insert. Also, a statement will be allowed to read deleted records that it deleted, but will not be able to read deleted records that it did not delete. Consider the following sequence of events, noting that records store three values, namely: begin transaction, end transaction, and statement id.

1. Transaction T1 begins.
2. Statement S1 in T1 begins.
3. S1 inserts record R1 (T1, –, S1).
4. S1 tries to read R1 and skips it because S1 created R1.
5. Statement S2 in T1 begins.
6. S2 reads record R1 and succeeds because S2 did not create R1
7. S2 deletes record R1 (T1, T1, S2).
8. S2 reads record R1 and succeeds because S2 deleted R1.
9. Statement S3 in T1 begins.
10. S3 tries to read record R1 and skips it because S3 did not delete R1.

Notably, steps 4 and 8 produce the opposite result of steps 6 and 10 as a result of a stored statement identifier matching the current statement. This shows the difference between actions taken when a statement created a record and when a statement deleted a record.

Some embodiments may further include functionality for determining state of a system at a previous time. For example, using the version numbers, embodiments can determine the state of a database prior to when a particular statement operated on records, to see the state of a system as a result of a statement operating on records, etc. For example, in some embodiments, the state of the system at a particular time or after execution of a particular statement can be determined by using a version number associated with the particular time or the particular statement, and all version numbers associated with earlier times and/or earlier statements. For example, if a user wanted to observe the state of a system as a result of executing a particular statement, any record associated with a version number associated with the statement, and any record associated with version numbers associated with previously executed statements could be used to present the previous state of the system to the user.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
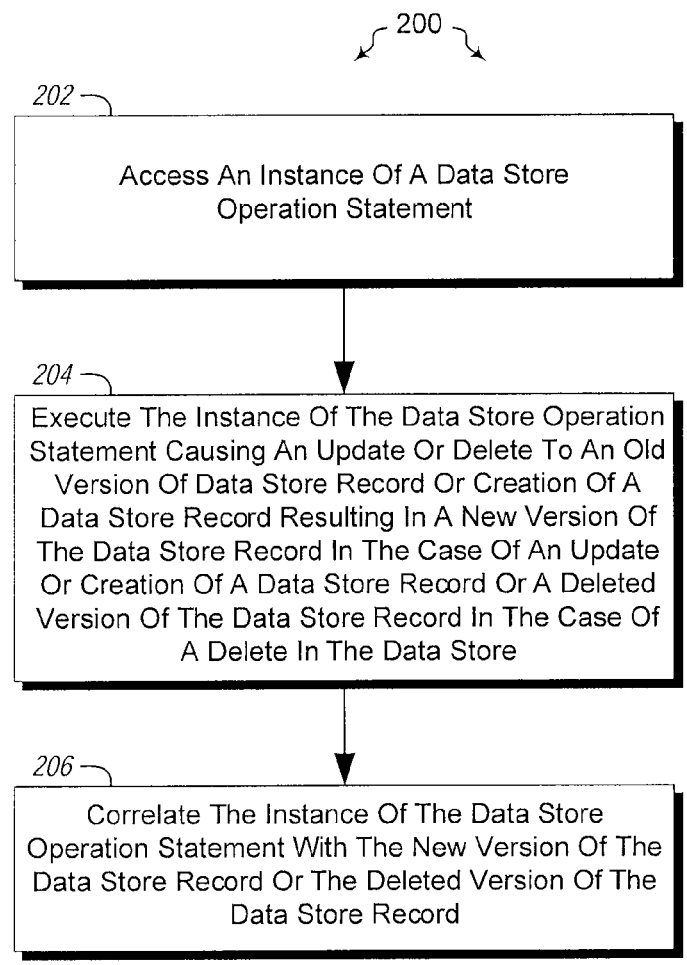
FIG. 2 illustrates a method of mitigating problems related to the Halloween problem.

Referring now to FIG. 2, a method 200 is illustrated. The method may be practiced in a computing environment and includes acts for mitigating problems related to the Halloween problem including where update operations potentially allow the record to be visited more than once during the operation. The method 200 includes accessing an instance of a data store operation statement (act 202). The method 200 further includes executing the instance of the data store operation statement. This causes an update or delete to an old version of data store record or creation of a data store record. A new version of the data store record is created in the case of an update or creation of a data store record. A deleted version of the data store record results in the case of the statement causing a delete in the data store (act 204). The method 200 further includes correlating the instance of the data store operation statement with the new version of the data store record or the deleted version of the data store record (act 206).

Illustratively, the method 200 may be performed where correlating the instance of the data store operation with the new version of the data store record or the deleted version of the data store record includes storing one or more identifiers associated with the instance of the data store operation statement in the new version of the data store record. Various embodiments and alternatives may implement this functionality. For example, in some embodiments, storing one or more identifiers associated with the instance of the data store operation statement in the new version of the data store record or the deleted version of the data store record may include simply storing some unique identifier in the data store record. For example, the identifier may be a globally unique identifier. In an alternative embodiment, storing one or more identifiers associated with the instance of the data store operation statement in the new version of the data store record or the deleted version of the data store record may include storing a transactionally unique identifier for a statement. For example, an identifier for the transaction including the instance of the data store operation statement, and an identifier for the instance of the data store operation statement within the transaction may be stored in the data store record.

Embodiments may be implemented where storing one or more identifiers associated with the instance of the data store operation statement in the new version of the data store record or the deleted version of the data store record may include storing one or more identifiers in a user accessible column of the new version of the data store record. For example, FIG. 1 illustrates where identifiers are stored in an identifier column 114. In alternative embodiments, embodiments may be implemented where storing one or more identifiers associated with the instance of the data store operation statement in the new version of the data store record or the deleted version of the data store record may include storing one or more identifiers in a record header for the new version of the data store record.

In some embodiments the one or more identifiers associated with the instance of the data store operation statement in the new version of the data store record or the deleted version of the data store record include version numbers. In some of these embodiments, methods may further include, once all available version numbers have been used, resetting all version numbers related to data store operation statements to a safe version number and reusing version numbers. For example, an implementation could reset all version numbers to zero and then begin assigning new version numbers from 1.

Embodiments may be implemented which include compressing one or more of the one or more identifiers associated with the instance of the data store operation statement in the new version of the data store record. For example, the number of bits or bytes allocated for version numbers may be based on transaction size. For example, transactions that execute fewer statements and generate relatively few version numbers could use less storage for these version numbers by tailoring the number of bits or bytes available for version numbers. For example, a transaction that executes 127 or fewer statements would need at most one byte of storage to store these version numbers.

Embodiments of the method 200 may be practiced where correlating the instance of the data store operation statement with the new version of the data store record or the deleted version of the data store record may include setting a single bit in the new version of the data store record or the deleted version of the data store record to indicate that the new version of the data store record or the deleted version of the data store record was created as a result of executing the instance of the data store operation statement. Thus, an extreme example of using small version numbers is embodied in an implementation that uses a single bit to indicate which records were created by the current statement. For example, a value of zero might mean that the record was created previously while a value of 1 might mean that the record was created by the current statement or vice versa. This bit could be reset as described above after each statement or before starting to execute a new statement. Thus, embodiments may further include clearing the single bit after the data store operation statement has finished executing.

Embodiments of the method 200 may be practiced where correlating the instance of the data store operation statement with the new version of the data store record or the deleted version of the data store record may include storing the new version of the data store record or the deleted version of the data store record in a list associated with a current transaction that includes records created by the instance of the data store operation statement within the context of the current transaction. In other examples illustrated above, statement identifiers were stored with records. However, some alternative embodiments may be implemented where a transaction stores a list of records created or deleted by the current statement. In some embodiments, this list may be stored in a data structure such as a hash table that makes searches efficient. A single list could be used for records that are created or deleted. However, both inserted and deleted records are added to the list. However, presence in the list has different effects depending on whether a record was inserted or deleted. In particular, presence in the list may cause a reverse in default visibility. For example, if the record is in the list as a result of being inserted, then the statement is prevented from reading the record. If the record is identified in the list as being deleted, then the statement would still be allowed to see the record. This list can be discarded after each statement completes. When reading, if a statement encounters a record created by the current transaction, it checks the list of records associated with the current transaction to determine if the record was created by the current statement and should be skipped or whether it previously existed and should be visible. Thus, embodiments may be implemented where methods further include discarding the list after the data store operation statement has finished executing.

Some embodiments including use of the list may include, when performing a read operation, determining that a record attempting to be read was created by the current transaction. As a result the method further includes checking the list of records associated with the current transaction to determine if the record was created by the instance of the data store operation statement and should be unreadable or whether the record previously existed and should be readable. This may facilitate the example where a record was inserted by the current statement and thus should be unreadable or the record was inserted by a different statement and thus should be readable.

Some embodiments including use of the list may include, when performing a read operation, determining that a record attempting to be read was created by the current transaction, and as a result, checking the list of records associated with the current transaction to determine if the record was deleted by the instance of the data store operation statement and should be readable or whether the record previously existed and should be unreadable. This may facilitate the example where a record was deleted by the current statement and thus should be readable or the record was deleted by a different statement and thus should be unreadable.

The method 200 may further include the same data store operation statement attempting to read the new version of the data store record. As a result of the correlation of the instance of the data store operation statement with the new version of the data store record, the method 200 includes preventing the data store operation statement from reading the new version of the data store record. Thus in this example, a statement will not be able to read records that it created.

The method 200 may further include the same data store operation statement attempting to read the deleted version of the data store record. As a result of the correlation of the instance of the data store operation statement with the deleted version of the data store record, the method 200 includes preventing allowing the data store operation statement to read the deleted version of the data store record. Thus, in this example, a statement will be able to read a record that it deleted.

The method 200 may further include a different data store operation statement attempting to read the new version of the data store record. As a result of the correlation of the instance of the data store operation statement with the new version of the data store record, the different data store operation statement is allowed to read the new version of the data store record.

The method 200 may further include a different data store operation statement attempting to read the deleted version of the data store record. As a result of the correlation of the instance of the data store operation statement with the deleted version of the data store record, the different data store operation statement is prevented from reading the deleted version of the data store record.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of mitigating problems related to the Halloween problem including where update operations allow the record to be visited more than once during the operation, the method comprising:
   accessing an instance of a data store operation statement, wherein the data store operation statement is part of a transaction with a plurality of different data store operation statements, and wherein the data store operation statement has a first identifier associated with the data store operation statement that is different than identifiers for the other data store operation statements within the same transaction;
   executing the instance of the data store operation statement causing an update or delete to an old version of data store record or creation of a data store record resulting in a new version of the data store record in the case of an update or creation of a data store record or a deleted version of the data store record in the case of a delete in the data store; and
   correlating the instance of the data store operation statement with the new version of the data store record or the deleted version of the data store record by storing the first identifier associated with the instance of the data store operation statement with the new version of the data store record, wherein the correlating the instance of the data store operation statement with the new version of the data store record is used to prevent the instance of the data store operation statement from reading the new version of the data store record so as to prevent the instance of a data store operation statement from seeing its own changes, but does not prevent the other data store operations statements in the same transaction from seeing the changes of the data store operation statement during execution of the transaction.

2. The method of claim 1, wherein said correlating the instance of the data store operation with the new version of the data store record or the deleted version of the data store record comprises storing one or more identifiers associated with the instance of the data store operation statement in the new version of the data store record.

3. The method of claim 2, wherein said storing one or more identifiers associated with the instance of the data store operation statement in the new version of the data store record or the deleted version of the data store record comprises storing an identifier for a transaction including the instance of the data store operation statement, and an identifier for the instance of the data store operation statement within the transaction.

4. The method of claim 2, wherein said storing one or more identifiers associated with the instance of the data store operation statement in the new version of the data store record or the deleted version of the data store record comprises storing a global identifier for the data store operation statement.

5. The method of claim 2, wherein said storing one or more identifiers associated with the instance of the data store operation statement in the new version of the data store record or the deleted version of the data store record comprises storing one or more identifiers in a record header for the new version of the data store record.

6. The method of claim 2, wherein said storing one or more identifiers associated with the instance of the data store operation statement in the new version of the data store record or the deleted version of the data store record comprises storing one or more identifiers in a user accessible column of the new version of the data store record.

7. The method of claim 2 wherein the one or more identifiers associated with the instance of the data store operation statement in the new version of the data store record or the deleted version of the data store record comprise version numbers, the method further comprising, once all available version numbers have been used, resetting all version numbers related to data store operation statements to a safe version number and reusing version numbers.

8. The method of claim 2 further comprising, compressing one or more of the one or more identifiers associated with the instance of the data store operation statement in the new version of the data store record or the deleted version of the data store record.

9. The method of claim 1, wherein said correlating the instance of the data store operation statement with the new version of the data store record or the deleted version of the data store record comprises setting a single bit in the new version of the data store record or the deleted version of the data store record to indicate that the new version of the data store record or the deleted version of the data store record was created as a result of executing the instance of the data store operation statement.

10. The method of claim 9, further comprising clearing the single bit after the data store operation statement has finished executing.

11. The method of claim 1, wherein said correlating the instance of the data store operation statement with the new version of the data store record or the deleted version of the data store record comprises storing the new version of the data store record or the deleted version of the data store record in a list associated with a current transaction that includes records created by the instance of the data store operation statement within a context of the current transaction.

12. The method of claim 11, further comprising discarding the list after the data store operation statement has finished executing.

13. The method of claim 11, further comprising when performing a read operation, checking the list of records associated with the current transaction to determine if the record was created by the instance of the data store operation statement and should be unreadable or whether the record previously existed and should be readable.

14. The method of claim 11, further comprising when performing a read operation, checking the list of records associated with the current transaction to determine if the record was deleted by the instance of the data store operation statement and should be readable or whether the record previously existed and should be unreadable.

15. The method of claim 1, further comprising the data store operation statement attempting to read the new version of the data store record and as a result of the correlation of the instance of the data store operation statement with the new version of the data store record, preventing the data store operation statement from reading the new version of the data store record.

16. The method of claim 1, further comprising the same data store operation statement attempting to read the deleted version of the data store record and as a result of the correlation of the instance of the data store operation statement with the deleted version of the data store record, allowing the data store operation statement to read the deleted version of the data store record.

17. The method of claim 1, further comprising a different data store operation statement attempting to read the new version of the data store record and as a result of the correlation of the instance of the data store operation statement with the new version of the data store record, allowing the different data store operation statement to read the new version of the data store record.

18. The method of claim 1, further comprising a different data store operation statement attempting to read the deleted version of the data store record and as a result of the correlation of the instance of the data store operation statement with the deleted version of the data store record, preventing the different data store operation statement from reading the deleted version of the data store record.

19. In a computing environment, a computer readable storage device comprising computer executable instructions that when executed by one or more processors cause one or more processors to perform functions for mitigating problems related to the Halloween problem including where update operations allow the record to be visited more than once during the operation, the functions comprising:

accessing an instance of a data store operation statement, wherein the data store operation statement is part of a transaction with a plurality of different data store operation statements, and wherein the data store operation statement has a first identifier associated with the data store operation statement that is different than identifiers for the other data store operation statements within the same transaction;

executing the instance of the data store operation statement causing an update or delete to an old version of data store record or creation of a data store record resulting in a new version of the data store record in the case of an update or creation of a data store record or a deleted version of the data store record in the case of a delete in the data store; and correlating the instance of the data store operation statement with the new version of the data store record or the deleted version of the data store record by storing the first identifier associated with the instance of the data store operation statement with the new version of the data store record, wherein the correlating the instance of the data store operation statement with the new version of the data store record is used to prevent the instance of the data store operation statement from reading the new version of the data store record so as to prevent the instance of a data store operation statement from seeing its own changes, but does not prevent the other data store operations statements in the same transaction from seeing the changes of the data store operation statement during execution of the transaction.

20. In a computing environment, a computing system configured to mitigate problems related to the Halloween problem including where update operations allow the record to be visited more than once during the operation, the system comprising:

one or more physical processors;

one or more computer readable storage media coupled to the one or more processors, wherein the computer readable storage medium comprises computer executable instructions that when executed by one or more of the one or more processors cause one or more of the one or more processors to perform the following functions:

accessing an instance of a data store operation statement, wherein the data store operation statement is part of a transaction with a plurality of different data store operation statements, and wherein the data store operation statement has a first identifier associated with the data store operation statement that is different than identifiers for the other data store operation statements within the same transaction;

executing the instance of the data store operation statement causing an update or delete to an old version of data store record or creation of a data store record resulting in a new version of the data store record in the case of an update or creation of a data store record or a deleted version of the data store record in the case of a delete in the data store; and correlating the instance of the data store operation statement with the new version of the data store record or the deleted version of the data store record by storing the first identifier associated with the instance of the data store operation statement associated with the new version of the data store record, wherein the correlating the instance of the data store operation statement with the new version of the data store record is used to prevent the instance of the data store operation statement from reading the new version of the data store record so as to prevent the instance of a data store operation statement from seeing its own changes, but does not prevent the other data store operations statements in the same transaction from seeing the changes of the data store operation statement during execution of the transaction.

* * * * *